March 23, 1954 W. G. KOGEL 2,672,737
ABSORPTION REFRIGERATION
Filed Aug. 19, 1950
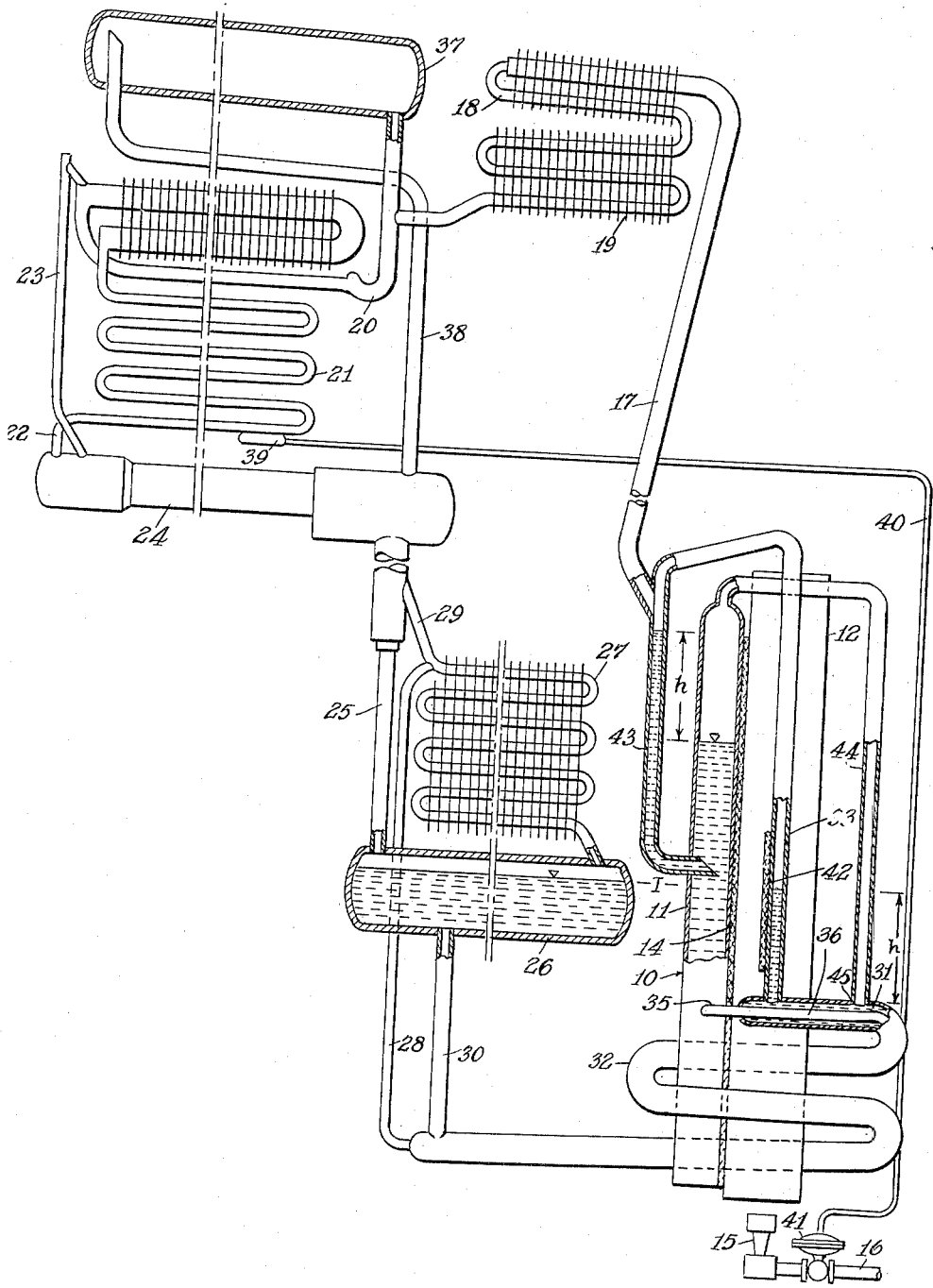
INVENTOR.
WILHELM GEORG KOGEL Patented Mar. 23, 1954

2,672,737

UNITED STATES PATENT OFFICE 2,672,737

ABSORPTION REFRIGERATION

Wilhelm Georg Kögel, Stockholm, Sweden, assignor to Aktiebolaget Elektrolux, Stockholm, Sweden, a corporation of Sweden Application August 19, 1950, Serial No. 180,477

Claims priority, application Sweden August 25, 1949

1 Claim. (Cl. 62—119.5)

My invention relates to refrigeration systems of the absorption type.

It is an object of my invention to effect improvements in the manner in which fluids are circulated in systems of this type, particularly to provide new arrangements for maintaining circulation of absorption solution with the aid of a heat operated pump over a wide range of heat input to the system. More particularly, it is an object to provide such new arrangements for raising liquid by vapor lift action with the aid of a heat operated pump in which absorption solution enriched in refrigerant is conducted to the pump in a path of flow in which the solution is not subjected to any direct heating action by an external source of heat, and by flowing to the pump in intimate contact with solution in such path of flow vapor generated or expelled from solution in the boiler of the vapor expulsion unit.

The novel features which I believe to be characteristic of my invention are set forth with particularity in the claim. The invention, both as to organization and method, together with the above and other objects and advantages thereof, will be better understood by reference to the following description taken in connection with the accompanying drawings forming a part of this specification, and of which the single figure diagrammatically illustrates an absorption refrigeration system embodying the invention.

Referring to the drawing, I have shown my invention in connection with an absorption refrigeration system of a uniform pressure type which is well known in the art and in which an inert pressure equalizing gas is employed. Such a refrigeration system comprises a generator or vapor expulsion unit 10 including a generator or boiler 11 containing a refrigerant, such as ammonia, in solution in a body of absorption liquid, such as water. Heat is supplied to the boiler 11 from a heating tube or flue 12 thermally connected therewith at 14, as by welding, for example. The heating tube 12 may be heated in any suitable manner, as by a liquid or gaseous fuel burner which is adapted to project its flame into the lower end of the tube. In the drawing the heating tube 12 is arranged to be heated by a gas burner 15 to which a suitable combustible gas is delivered through a conduit 16.

The heat supplied to the boiler 11 and its contents expels refrigerant vapor out of solution, and, in a manner to be described presently, the refrigerant vapor passes upwardly from the vapor expulsion unit 10 through a conduit 17 and through an air cooled rectifier 18 into an air cooled condenser 19 in which it is condensed and liquefied. Liquid refrigerant flows from condenser 19 through a conduit 20 into a cooling element 21 in which it evaporates and diffuses into an inert pressure equalizing gas, such as hydrogen, which enters through a conduit 22. Due to evaporation of refrigerant fluid into inert gas in cooling element 21, a refrigerating effect is produced with consequent absorption of heat from the surroundings.

The rich gas mixture of refrigerant vapor and inert gas formed in cooling element 21 flows from the upper part thereof through a conduit 23, one passage of a gas heat exchanger 24, conduit 25 and absorber vessel 26 into the lower end of an absorber coil 27. In absorber coil 27 the rich gas mixture flows counter-current to downwardly flowing absorption liquid which enters through a conduit 28. The absorption liquid absorbs refrigerant vapor from inert gas, and inert gas weak in refrigerant flows from absorber coil 27 in a path of flow including a conduit 29, another passage of gas heat exchanger 24 and conduit 22 into the lower part of cooling element 21.

The circulation of gas in the gas circuit just described is due to the difference in specific weight of the columns of gas rich and weak, respectively, in refrigerant vapor. Since the column of gas rich in refrigerant vapor and flowing from cooling element 21 to the absorber coil 27 is heavier than the gas weak in refrigerant and flowing from the absorber coil 27 to cooling element 21, a force is produced or developed within the system for causing circulation of inert gas in the manner described.

Absorption solution enriched in refrigerant flows from the absorber vessel 26 through a conduit 30 and an outer passage or pipe 31 of liquid heat exchanger 32 disposed about the lower part of the vapor expulsion unit 10. As will be described presently, liquid flows from the outer pipe 31 of the liquid heat exchanger into the lower end of a vapor lift pipe or tube 33 through which liquid is raised by vapor-liquid lift action to a higher level in the vapor expulsion unit 10. Refrigerant vapor expelled out of solution in boiler 11 flows upwardly from the vapor expulsion unit 10 to the condenser 19 in a path of flow to be described more fully hereinafter. The absorption liquid from which refrigerant vapor has been expelled flows from the boiler 11 through a conduit 35, inner pipe or passage 36 of liquid heat exchanger 32 and conduit 28 into the upper part of absorber coil 27. The circulation of absorption solution in the liquid circuit just described is effected by raising of liquid through pipe 33.

The outlet end of condenser 19 is connected by an upper extension of conduit 20, vessel 37 and conduit 38 to a part of the gas circuit, as at one end of gas heat exchanger 24, for example, so that any inert gas which may pass through the condenser 19 can flow into the gas circuit. Refrigerant vapor not liquefied in the condenser flows through the upper part of conduit 20 to displace inert gas in vessel 37 and force such gas into the gas circuit. The effect of forcing gas into the gas circuit in this manner is to raise the total pressure in the entire system whereby an adequate condensing pressure is obtained to insure condensation of refrigerant vapor in condenser 19.

The refrigeration system just described may be controlled by a thermal bulb 39 which is affected by a temperature condition of cooling element 21. As shown, the thermal bulb 39 is arranged in thermal exchange relation with the bottom part of cooling element 21 and connected by a conduit 40 to a control device 41 which is connected in the fuel supply conduit 16. The thermal bulb 39 and conduit 40 may form part of an expansible fluid thermostat which is charged with a suitable volatile fluid for operating the control device 41 with changes in temperature of cooling element 21, in a manner well known in the art.

When the temperature of cooling element 21 increases due to an increase in load on the cooling element, thermal bulb 39 becomes effective to operate control device 41 to increase the supply of fuel to burner 15 whereby the latter operates with a normal or maximum flame and heat is supplied at "maximum" heat input to the vapor expulsion unit 10. Under these conditions refrigerant vapor is expelled from solution in vapor expulsion unit 10 at an increased rate, thereby increasing the amount of refrigerant vapor which condenses in condenser 19 and flows into cooling element 21.

Conversely, when the temperature of cooling element 21 decreases, the thermal bulb 39 becomes effective to operate control device 41 to decrease the supply of fuel to burner 15 whereby the latter operates with a pilot flame and heat is supplied at a "minimum" or reduced heat input to the vapor expulsion unit 10. Under these conditions, the rate at which refrigerant vapor is expelled out of solution in the vapor expulsion unit 10 is reduced, thereby decreasing the amount of refrigerant vapor which condenses in condenser 19 and flows into cooling element 21.

In accordance with my invention I provide an improved vapor expulsion unit for effectively initiating and maintaining circulation of absorption solution in the liquid circuit under different conditions encountered in practice. The vapor expulsion unit includes the lift tube or pump pipe 33 connected to receive absorption solution enriched in refrigerant and flowing thereto from the absorber vessel 26 and outer passage 31 of liquid heat exchanger 32. The lift tube 33 is heat conductively connected at 42 to the heating tube 12 to vaporize liquid in the lift tube and effect lifting of liquid by vapor lift action with the aid of vapor thus formed in the lift tube.

The raised liquid passing from the upper end of lift tube 33 flows downwardly through a conduit 43 whose lower end is connected to the boiler 11 at a region below the liquid level therein. The lifting vapor is separated from the raised liquid and passes from the upper end of lift tube 33 through conduit 17 to the condenser 19. The heating tube 12 heats enriched absorption solution in the boiler or pipe 11 to cause expulsion of refrigerant vapor from solution. The principal part of the generated vapor produced in the vapor expulsion unit 10 is expelled from solution in the boiler 11, and absorption solution weak in refrigerant flows therefrom through conduit 35, inner passage 36 of liquid heat exchanger 32 and conduit 28 into the upper end of absorber coil 27, as previously explained.

Vapor expelled from solution in the boiler 11 flows from the upper part thereof through a conduit 44 which includes a downwardly extending portion having the lower end thereof connected to the upper section or turn of the liquid heat exchanger 32 at a region 45 which is removed from the connection of the lift tube 33 with the liquid heat exchanger. The vapor passes from the lower end of conduit 44 and then in a horizontally extending direction in intimate contact with absorption solution enriched in refrigerant which is flowing through the extreme upper portion of the outer passage 31 of the liquid heat exchanger. The generated vapor from boiler 11 then passes upwardly in lift tube 33 and is utilized to effect lifting of liquid by vapor lift action. Hence, the vapor generated in boiler 11 also finds its way to the upper end of conduit 43 and passes through conduit 17 to the condenser 19.

In view of the foregoing it will now be understood that all of the generated vapor produced in boiler 11 is effectively utilized to raise liquid by vapor lift action in the lift tube 33. The generated vapor usually is a mixture of refrigerant vapor and absorption liquid vapor; and, when ammonia and water are employed as the refrigerant and absorption liquid, for example, the generated vapor usually is a mixture of ammonia and water, the water vapor may be removed from ammonia by cooling the mixture to condense out the water.

The absorption liquid passing through the extreme upper section of the liquid heat exchanger passage 31 is relatively rich in refrigerant and at a lower temperature than the generated vapor, and, in coming in intimate contact with the enriched solution, the water vapor is cooled sufficiently and condenses and in this way is removed from the ammonia vapor. The latent heat of condensation resulting from condensation of water vapor is given up to the enriched absorption solution, whereby some ammonia vapor is expelled out of solution. Such expelled refrigerant vapor mixes with refrigerant vapor generated in the boiler 11, and the mixture passes upwardly through the lift tube 33 and conduit 17 to the condenser 19.

When the refrigeration system is initially placed in operation following a shut down period the liquid level in conduit 44 is substantially at the level l which is the liquid level in the absorber vessel 26. When generated vapor is produced in boiler 11, the liquid must be depressed in conduit 44 through a distance $h$ before the vapor passes into the outer liquid heat exchanger passage 31. The liquid column in the conduit 43 balances the vapor pressure maintained in boiler 11 under such operating conditions and, in order that the liquid in conduit 43 will not block flow of vapor from lift tube 33 into conduit 17, the conduit 43 should extend vertically from the liquid level in boiler 11 for a distance substantially greater than the distance $h$.

The vapor expulsion unit 10 possesses certain advantages of which the most important is certain starting under all operating conditions encountered. This is accomplished by supplying heat to lift tube 33 to a limited extent through the heat conductive connection 42 from the heating tube 12 when operation under maximum heat input conditions is initiated, and flowing generated vapor from the boiler 11 to the lift tube to promote raising or pumping of liquid by vapor lift action.

Modifications of the embodiment of my invention which I have described will occur to those skilled in the art, so that I desire my invention not to be limited to the particular arrangements set forth. Therefore, I intend in the claim to cover all those modifications which do not depart from the spirit and scope of my invention.

What is claimed is:

In an absorption refrigerating system, a circuit for circulation of absorption solution including a boiler and an absorber and a liquid heat exchanger therebetween having inner and outer passages, means for heating said boiler to expel vapor from solution therein, a pump for raising liquid having the upper end thereof communicating with said boiler, said pump comprising a vapor-liquid lift including a riser having a cross-sectional area of such size lengthwise thereof that vapor entering the extreme lower end of such riser is capable of lifting liquid therein, first conduit means including the outer passage of said liquid heat exchanger for conducting from said absorber to said pump absorption solution enriched in refrigerant, the outer passage of said liquid heat exchanger including a horizontally extending portion having first and second regions at spaced apart portions thereof, second conduit means for conducting vapor from said boiler into intimate physical contact with enriched absorption solution at the first region of the outer passage of said liquid heat exchanger and through such outer passage to the second region thereof which is removed from said first region, said riser comprising an upright pipe extending upwardly from said second region, the second region of the outer passage of said liquid heat exchanger being at the extreme lower end of said riser and at which said enriched absorption solution is initially raised by vapor lift action with vapor from said boiler, and means for heating said solution to promote raising thereof in said riser by vapor lift action which is augmented by said boiler vapor, said last-mentioned heating means including provisions for heating said upright pipe and being operable to effect heating of said absorption solution after passing the first region of the outer passage of said liquid heat exchanger and before being raised by the higher level from the second region thereof and ineffective to apply heat directly to absorption solution at the immediate vicinities of the first and second regions of the outer passage of said liquid heat exchanger.

WILHELM GEORG KÖGEL.

References Cited in the file of this patent

UNITED STATES PATENTS

| Number | Name | Date |
|---|---|---|
| 1,780,272 | Munters | Nov. 4, 1930 |
| 1,791,441 | Bertsch | Feb. 3, 1931 |
| 2,080,195 | Bergholm | May 11, 1937 |
| 2,169,214 | Bergholm | Aug. 15, 1939 |
| 2,191,551 | Ullstrand | Feb. 27, 1940 |
| 2,324,810 | Ashby | July 20, 1943 |
| 2,337,653 | Ehnbom | Dec. 28, 1943 |
| 2,507,624 | Edel | May 16, 1950 |

FOREIGN PATENTS

| Number | Country | Date |
|---|---|---|
| 676,408 | France | Feb. 22, 1930 |